United States Patent
Israel et al.

(10) Patent No.: US 6,937,823 B2
(45) Date of Patent: Aug. 30, 2005

(54) METHOD FOR PREVENTING LASING IN AN OPTICAL RING NETWORK

(75) Inventors: John G Israel, Fair Haven, NJ (US); Gerard Lingner, III, Long Branch, NJ (US); John Mark Ritchey, Burlington, NC (US); Singanallur R. Thangavelu, Dayton, NJ (US); William A Thompson, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 499 days.

(21) Appl. No.: 09/799,369

(22) Filed: Mar. 5, 2001

(65) Prior Publication Data

US 2002/0131098 A1 Sep. 19, 2002

(51) Int. Cl.[7] ............................. G02F 1/00; H04J 14/00; H04B 10/20
(52) U.S. Cl. ................................ 398/83; 398/3; 398/4; 398/49; 398/59
(58) Field of Search ........................... 398/59, 3, 4, 83, 398/49, 14, 1, 2, 5, 7

(56) References Cited

U.S. PATENT DOCUMENTS

| | | | | |
|---|---|---|---|---|
| 5,406,401 A | * | 4/1995 | Kremer | 398/4 |
| 6,025,941 A | * | 2/2000 | Srivastava et al. | 398/7 |
| 6,122,753 A | * | 9/2000 | Masuo et al. | 714/4 |
| 6,154,296 A | * | 11/2000 | Elahmadi et al. | 398/83 |
| 6,583,900 B2 | * | 6/2003 | Onaka et al. | 398/59 |
| 6,614,754 B1 | * | 9/2003 | Usuba et al. | 370/222 |
| 6,616,350 B1 | * | 9/2003 | de Boer et al. | 398/9 |
| 6,625,115 B1 | * | 9/2003 | Ikeda et al. | 370/217 |

* cited by examiner

*Primary Examiner*—M. R. Sedighian

(57) ABSTRACT

Lasing of an optical channel at a particular wavelength is substantially prevented in an optical ring network by automatically verifying the presence of a break, e.g., termination, in the ring for an optical channel of a particular wavelength before allowing a node in the network to establish a "pass through" connection for that optical channel. More specifically, a node attempting to establish a "pass through" route for an optical channel received from another node is prevented from establishing the necessary connections to do so until it is confirmed that the optical channel of interest has been added to the ring or dropped from the ring at another node, thus indicating the presence of a "break" in the optical ring for that optical channel of interest.

14 Claims, 3 Drawing Sheets

100

METHOD FOR PREVENTING LASING IN AN OPTICAL RING NETWORK

FIELD OF THE INVENTION

The invention relates generally to optical communication systems employing wavelength division multiplexing (WDM) and, more particularly, to the prevention of lasing in such optical communication systems configured in a ring topology.

BACKGROUND OF THE INVENTION

To meet the increasing demands for more bandwidth and higher data rates in today's networks, wavelength division multiplexing (WDM) is being used extensively in long haul optical transmission systems and is being contemplated for use in short haul applications, such as metropolitan area networks and the like. As is well known, WDM combines many optical channels each at a different wavelength for simultaneous transmission as a composite optical signal in a single optical fiber.

As is well known, an optical transmission system can be configured in a ring topology whereby a plurality of network elements are interconnected by optical fibers. An optical ring network will typically include a plurality of add/drop nodes at which one or more individual wavelength channels can be dropped from or added to the WDM signal that is transported around the ring. Optical ring networks present some unique challenges in contrast to point-to-point configurations and the like. For example, lasing can occur as an optical signal is transported around an optically-amplified ring because the Amplified Spontaneous Emission (ASE) noise of optical amplifiers can experience a net gain as it makes a loop around the ring increasing the power level of the ASE to the point of becoming dangerous or damaging to equipment and personnel as well as adversely affecting system performance. In many configurations, lasing can occur in a short amount of time thus rendering manual-based intervention ineffective. Accordingly, care must be taken in optical ring networks to ensure that the ring does not "close" for any particular wavelength channel transported around the ring, i.e., so that a closed loop is not formed for any given channel.

Provisioning of an optical ring network typically involves a manual process for determining which optical channels of particular wavelengths (hereinafter "optical channels") are to be used for carrying traffic around the ring between the various nodes. Among other problems, these manual-based provisioning arrangements are generally slow, require involvement of technicians at the various nodes in the network, and are prone to errors that may lead to service-affecting outages on the ring, especially in rings that use extensive add/drop capability.

To facilitate the provisioning process, one common approach is to maintain a database at the various nodes within a network for managing wavelength assignments for optical channels being added, dropped, and routed around the ring network. Entries in the databases indicate associations, whereby an association represents how an optical channel is routed at a particular node. For example, connections are required between ports of different components within a node depending on the provisioning of the optical channel at that node. Associations can be used to specify information such as source port, destination port, wavelength, and so on. By way of example, a source port may be a demultiplexer port that supplies a demultiplexed channel, an output port of an optical translator unit, and so on.

In one commonly employed scheme, an "ADD" association indicates that the optical channel is being added at that node and therefore certain connections between components in the node would be required to implement the "ADD" association. Similarly, a "DROP" association indicates that the optical channel is being dropped at that node and therefore other connections between components in the node would be required to implement the "DROP" association. A "THRU" association is yet another association used to indicate that an optical channel is to be passed through a node, e.g., so-called normal-through or express routing. The aforementioned problem of lasing is a particular concern when "THRU" connections are made at a node because one node may implement a "THRU" connection without knowing whether there is a "break" somewhere else in the ring for that particular optical channel. If a break does not exist, then lasing can occur.

SUMMARY OF THE INVENTION

Lasing of an optical channel at a particular wavelength is substantially prevented in an optical ring network according to the principles of the invention by automatically verifying the presence of a break, e.g., termination, in the ring for an optical channel of a particular wavelength before allowing a node in the network to establish a "pass through" connection for that optical channel. More specifically, a node attempting to establish a "pass through" route for an optical channel received from another node is prevented from establishing the necessary connections to do so until it is confirmed that the optical channel of interest has been added to the ring or dropped from the ring at another node thus indicating the presence of a "break" in the optical ring for that optical channel of interest. By ensuring that there is a "break" in the optical ring, the optical channel cannot otherwise propagate around a closed loop in the ring and cause lasing at the wavelength of that optical channel.

In one illustrative embodiment, an optical ring network comprises a plurality of nodes interconnected by optical fiber. A wavelength division multiplexed (WDM) optical signal having a plurality of individual optical channels at different wavelengths is transported around the ring and one or more individual optical channels are added and/or dropped at selected nodes in the ring. Before a node can respond to a provisioning request to enter a "THRU" association for a particular optical channel, e.g., set up and implement "pass through" routing of an optical channel through that node, a verification process is initiated to determine whether any other node in the ring has an "ADD" association for that particular optical channel (e.g., database entry, stored in memory, accessible in control software, etc.) and whether actual connections for the "ADD" are active at the node with the "ADD" association. In particular, once a node is found with an "ADD" association for the optical channel of interest, the actual connections within that node are verified by using trace tones modulated onto the optical channel added at that node, e.g., verifying transmission of the optical channel and associated tone between components in the node that are used for adding the optical channel to the ring. One of the nodes in the ring is designated as a management node to initiate the verification requests and to manage the process to ensure that only one verification request is active at any given time within the ring.

BRIEF DESCRIPTION OF THE DRAWING

A more complete understanding of the present invention may be obtained from consideration of the following detailed description of the invention in conjunction with the drawing, with like elements referenced with like references, in which.

DETAILED DESCRIPTION OF THE INVENTION

Figure 1:
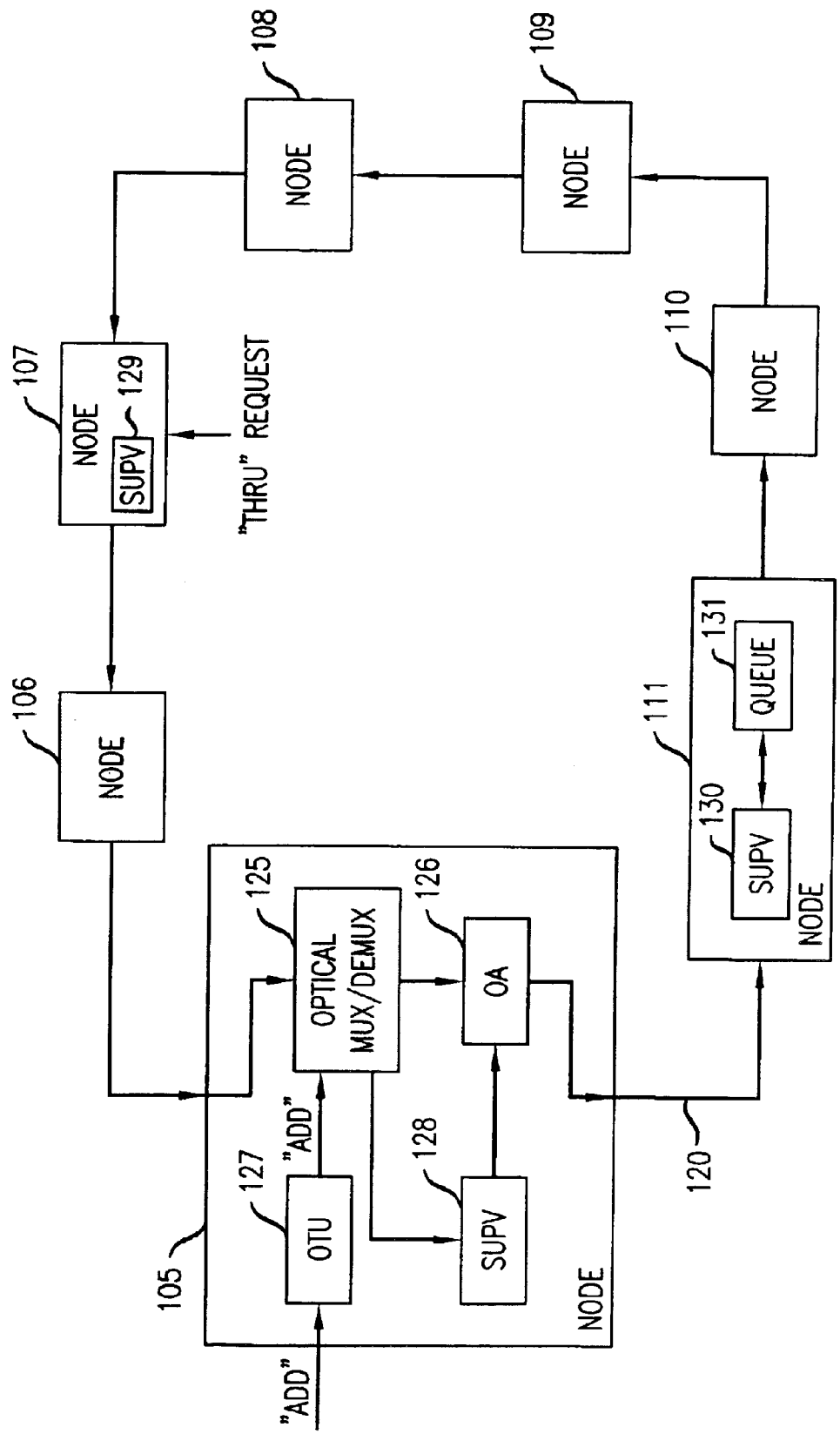
FIG. 1 is a simplified block diagram of an optical ring network according to one illustrative embodiment of the invention.

FIG. 1 shows an optical ring network 100 comprising a plurality of nodes 105–111 interconnected by optical fiber 120. In this embodiment, node 105 includes optical multiplexer/demultiplexer 125, optical amplifier 126, optical translator unit 127, and supervisory element 128. Although not explicitly shown, the equipment configuration of nodes 106–111 can be similar to that shown for node 105, although the add/drop capability of any given node in a ring can be different as a matter of design choice. For example, a node can include the necessary components for adding/dropping every optical channel in the WDM signal or for adding/dropping only a subset of the total number of individual optical channels in a WDM signal, e.g., selected ones. In the typical ring network, there is typically at least one node having the capability to add/drop all optical channels from a WDM signal although the principles of the invention are not intended to be limited by such an illustrative configuration. More generally, it should be noted that other aspects of the configuration of network 100 and nodes 105–111 are only meant to be illustrative as many other network and node configurations are contemplated by the teachings herein. For example, node 105 is shown to include only one optical amplifier (126), although those skilled in the art will appreciate that the principles of the invention can be utilized with various node configurations, e.g., nodes having more than one optical amplifier, and so on.

Moreover, for simplicity of illustration and explanation of the principles of the invention, only supervisory element 129 is shown in node 107, although it is to be understood that node 107 includes other components for carrying out the necessary functions within network 100. Similarly, node 111 is shown to include supervisory element 130 and queuing means 131 for purpose of illustrating a specific example of how the principles of the invention can be applied in network 100. It is assumed that each of nodes 105–111 knows the address of the other nodes in ring network 100 using well-known techniques.

Node 105 is shown to include components and connections for adding an optical channel to the WDM signal being transported around ring network 100. As shown and as will be described in further detail below, node 105 includes an "ADD" association and connection for a particular optical channel. Briefly, the signal to be added is provided to optical translator unit 127 where, among other functions, the signal is converted to a compatible wavelength for subsequent combination with the WDM signal via optical multiplexer/demultiplexer 125. Optical translator units, the function and operation of which are well known, can be advantageously used to facilitate both add and drop functions. Other alternatives to optical translator units are also contemplated by the teachings herein, e.g., using optical multiplexers and demultiplexers to add and/or drop optical channels between ring network 100 and an external network (not shown).

The combined WDM signal is then amplified by optical amplifier 126 and output via optical fiber 120 to node 111 in ring network 100. A supervisory optical channel is filtered or otherwise tapped from the WDM signal and provided to supervisory element 128. In this embodiment, the supervisory optical channel is coupled back into the WDM signal via optical amplifier 126. As will be described in further detail below, supervisory optical channels are used in one illustrative embodiment of the invention to carry out the control scheme for preventing lasing in ring network 100. For example, messaging, commands, and other software-based control can be communicated among the various nodes and control elements via the supervisory optical channel and associated supervisory elements.

According to another aspect of the invention, one of nodes 105–111 would serve as a management node to control the association and verification process in ring network 100, e.g., managing the request to establish a "THRU" association and connection at node 107. In the example shown in FIG. 1, node 111 is designated as the management node. Selection of a management node is a matter of design choice and can be determined on different criteria, such as node with the lowest network address and so on. As described, node 111 is shown to include a supervisory element 130 and a queuing means (e.g., memory, database, etc.) 131 for queuing verification requests as will be described in further detail.

Figure 2:
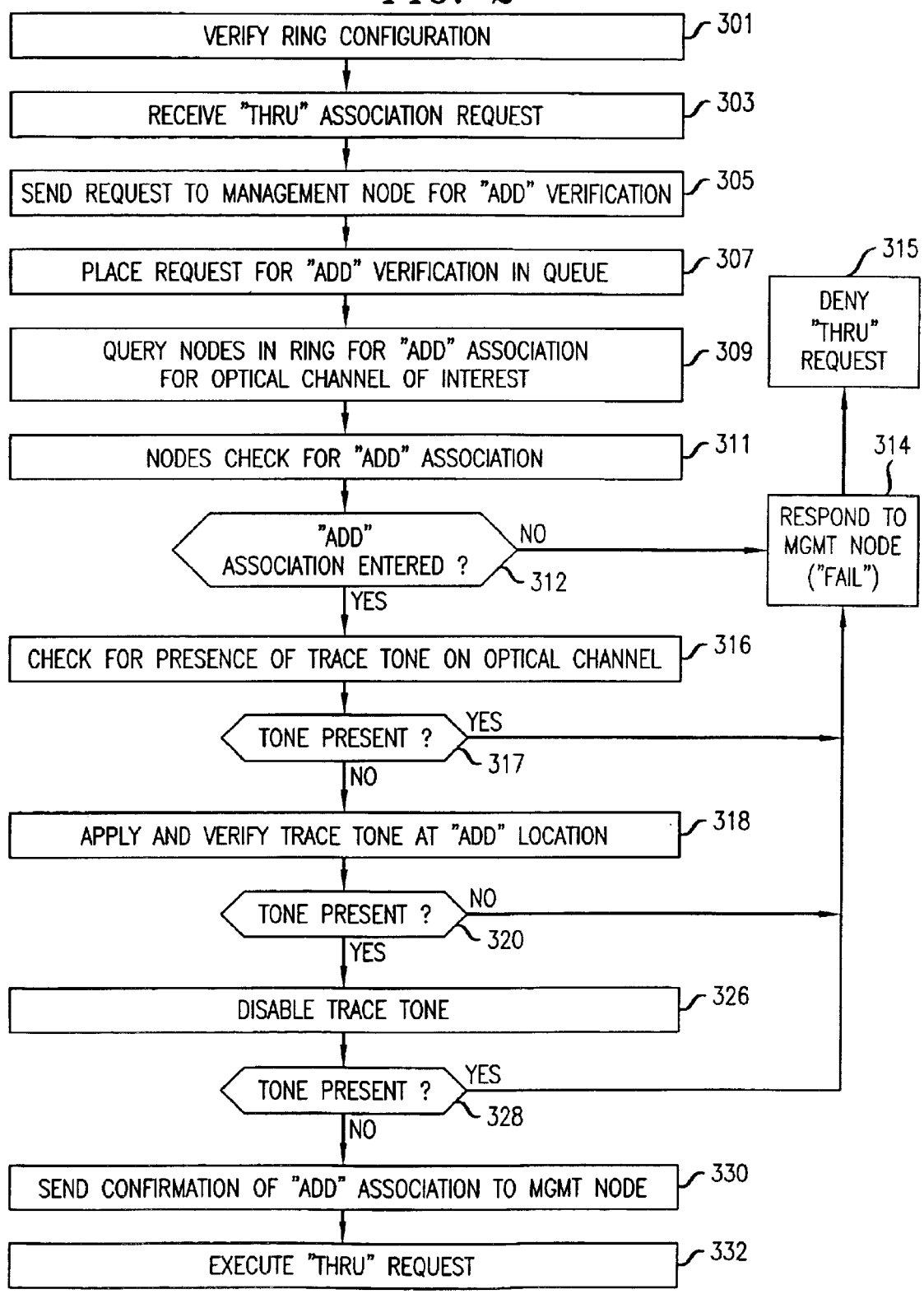
FIG. 2 is a simplified flow diagram of a method for preventing lasing in the optical ring network of FIG. 1 according to the principles of the invention.

FIG. 2 shows a method for preventing lasing of an optical channel in ring network 100 from FIG. 1 according to the principles of the invention. In this example, it is assumed that a "THRU" association request is received at node 107 (FIG. 1) and that an "ADD" association exists at node 105. Although other nodes may have "ADD" associations for the optical channel of interest, only one is shown here for simplicity of illustration and explanation. As a preliminary check in step 301, it is first determined whether the network is in fact a ring network. Because each node in a ring knows the address of other nodes in the ring, well known techniques can therefore be used to verify whether the nodes are configured in a ring. For example, ring configurations can be verified during ring map construction, topology discovery, and so on.

In the illustrative embodiment shown in FIG. 1, the nodes involved in servicing the request for a "THRU" association on a particular optical channel are node 107 where the "THRU" association request is received, node 105 which has an "ADD" association for the particular optical channel, and node 111 which is the management node, e.g., the node having the lowest network address in this example. As mentioned, there may be more than one node having an "ADD" association for the optical channel. For example, the same wavelength can be used between two different pairs of nodes as long as the routing around the ring does not overlap. As such, these other nodes would also be involved in the verification process for servicing the "THRU" association request, i.e., each node is checked for an "ADD" association for the optical channel of interest.

As shown in step 303, node 107 (FIG. 1) receives a request for a "THRU" association for an individual optical channel (e.g., one wavelength channel of the WDM signal). By way of example, a "THRU" association request can originate from an operations systems and be received by a controller element in the node. By implementing such a "THRU" association, node 107 would pass the requested optical channel directly through without performing any add or drop functions for that optical channel. In step 305, node 107 sends a request to management node 111, e.g., via supervisory elements 129 and 130, to verify that a "break" exists somewhere in ring network 100 for the particular optical channel before the "THRU" association and/or connection is entered at node 107. One method for verifying the presence of a "break" is to check for an "ADD" association for the particular optical channel of interest. Although multiple "ADD" associations may exist in the ring for a given optical channel, only one is needed to establish that a "break" exists in the ring according to the principles of the invention. That is, only one confirmed "break" in the ring is needed to ensure that the ring does not form a closed loop for any given wavelength. In this manner, lasing at the wavelength of the optical channel of interest can be avoided.

It should be noted that requests, commands, and so on that are associated with this illustrative method can be implemented in one embodiment using control systems or subsystems. For example, requests can originate from an element management system or craft interface terminal and commands may be executed via the various controller elements in a node. Moreover, node-to-node communications in one embodiment can be implemented via the supervisory channel and associated supervisory elements used in WDM systems. As is well-known, the supervisory channel is a separate optical channel that is typically used for various communication needs in a WDM network, e.g., alarms, maintenance, control, monitoring, administration, and so on. As such, the operation of supervisory elements 128–130 and the associated supervisory channel as well as various messaging implementations using the supervisory channel will be apparent to those skilled in the art. It should also be noted that other schemes can also be used to effect the control and messaging requirements in accordance with the principles of the invention, e.g., network management systems, etc.

Management node 111 places the received request into a queue in step 307. The queue can be implemented via memory in a controller device, accessed via a database, and so on. Management of the queue is also a matter of design choice, e.g., prioritization and scheduling of servicing the requests and so on. Upon selecting the next request for processing, management node 111 sends a query in step 309 to each node in ring network 100 to determine whether an "ADD" association exists for the optical channel of interest. This query may include checking management node 111 for the "ADD" association as well. For the embodiment shown in FIG. 1, the query may involve such checks as identifying whether there is an optical translator unit at the respective node, whether a connection exists between the optical translator unit and optical amplifier in the respective node, and whether an "ADD" association is entered in the database at the respective node. Although not explicitly shown, management node 111 may employ one or more timers according to well-known techniques in conjunction with sending queries to the other nodes and receiving responses thereto.

Upon receipt of the query, each node will independently verify in step 311 whether an "ADD" association exists in its respective database for the optical channel of interest. If a node determines that an "ADD" association is not entered in its respective database or memory in step 312, then that node responds accordingly to management node 111 as shown in step 314 by sending a message that the verification failed (e.g., that a "break" does not exist at that particular node for the optical channel of interest). If an "ADD" association is not identified in any of the queried nodes, as indicated by the messages sent to management node 111 (e.g., verification failed), then management node 111 would then communicate with node 107 (where the "THRU" request was initiated) to deny the request as shown in step 315. In this example, management node 111 would therefore wait for responses from every queried node before denying the request at node 107.

When a node determines that it has an "ADD" association in its database or memory for the optical channel of interest (e.g., node 105 in FIG. 1), the node then commences a verification of the actual connections within the node for that optical channel. In step 316, for example, a check is made to determine whether a tone is already present on the optical channel of interest. If tone is detected in step 317, then a "failed" message is sent to management node 111 and the "THRU" request is denied in steps 314 and 315 as previously described. The purpose of checking for trace tones at this point would be to verify that an upstream node has not already applied a tone that might be otherwise confused with a verification of an "ADD" association at the present node being checked. If tone is not already present on the optical channel of interest as determined in step 317, then a trace tone is applied to the optical channel as shown in step 318 to verify the connections associated with the added channel. In this manner, the actual connections can be verified to ensure that the optical channel of interest is, in fact, being added at the node as indicated by the association stored in memory or the database.

There are various well-known techniques for applying and verifying the presence of a trace tone in an optical path and these techniques will be apparent to those skilled in the art. For example, various modulation techniques can be used to apply the trace tone and various optical monitoring techniques can be used to verify the presence of the test tone. In the example shown in FIG. 1, a trace tone could be added to the signal generated by optical translator unit 127 in node 105 and verified at optical amplifier 126. It should be noted that there are also other alternatives to using trace tones to verify actual signal connections in an optical pathway. For example, the signal being added via the optical channel of interest can be pulsed on and off in a manner that is detectable and recognizable by monitoring equipment. The output power of the optical translator unit could also be decreased by a predetermined amount in some software-controlled pattern that is again detectable and recognizable. In yet other approaches, the optical signal can be dithered within a specified range or a digital signature (e.g., embedded bits) carried within the payload information (e.g., SONET overhead bytes) transported in the optical channel can be used.

Continuing with the steps in FIG. 2, if the trace tone is not detected in step 320, then the appropriate response indicating a failed verification is sent to the management node in step 314 and the "THRU" association request is denied in step 315 as previously described. If the trace tone is detected in step 320, then the trace tone is then disabled or otherwise terminated in step 326. Optionally, the optical channel can be checked to verify that tone is no longer present in step 328 to ensure that an upstream node, for example, has not applied a trace tone in a manner that may conflict with the verification process. If tone is still present in step 328, despite being disabled in step 326, then the appropriate response indicating a failed verification (step 314) and request denial (step 315) would be carried out as previously described. If the absence of tone is confirmed in step 328, then a confirmation or equivalent message is sent to the management node indicating that an "ADD" association has been verified at the node and that the actual connections for adding the signal are active. In step 332, the "THRU" association is executed by the requesting node (e.g., node 107 in FIG. 1) once management node 111 communicates the confirmation of a "break" in the ring to node 107. Node 107 would then carry out the necessary actions to enter the "THRU" association and make the appropriate connections, e.g., set switches and so on.

Various modifications to the above verification process will be apparent to those skilled in the art and are contemplated by the teachings herein. For example, timers can also be employed by the management node to control the verification process. In this manner, a request for a "THRU" association can be denied if either the management node only receives failed messages from the nodes having "ADD" associations for the optical channel of interest or if timers expire during the verification process before any nodes respond with a confirmation of either having an "ADD" association or the results of verifying the actual connections for the "ADD" associations, e.g., sending trace tones, etc.

According to another aspect of the invention, one of the purposes of having a management node is to prevent multiple requests from being active in the ring network at any given time. In particular, multiple requests can, in turn, cause conflicting actions to occur in ring network 100. For example, trace tones are used in one illustrative embodiment to verify an "ADD" association, e.g., sending a tone from optical translator unit 127 of FIG. 1 to optical amplifier 126 to verify the connection for the added channel. As described, one conventional method for adding a trace tone is to apply amplitude modulation to the optical signal generated by the optical translator unit. Because the trace tone can propagate through multiple nodes, a trace tone can therefore appear at downstream nodes and equipment. Consequently, the presence of a trace tone from an upstream node can corrupt the verification occurring at a downstream location. For example, multiple "THRU" association requests occurring within the same time period would in turn cause multiple requests for verification of "ADD" associations leading to the above problem. In one embodiment, the management node will employ a queuing scheme, e.g., via queuing means 131 in FIG. 1, to ensure only one verification of an "ADD" association can occur in the ring network at any given time.

Figure 3:
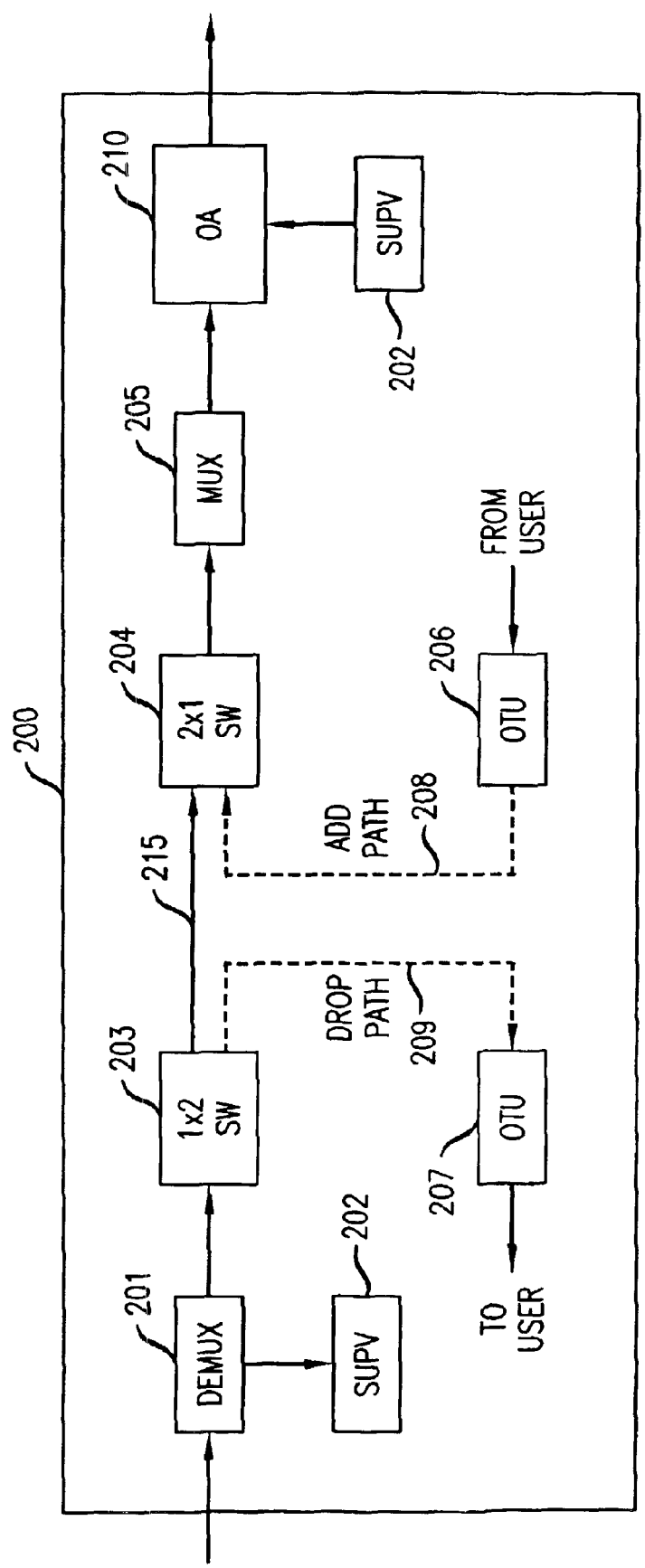
FIG. 3 is a simplified block diagram of a network element from the optical ring network in FIG. 1 according to another illustrative embodiment of the invention.

FIG. 3 shows another exemplary embodiment of a ring node 200 illustrating another aspect of the invention. Briefly, optical switches can be included in the ring nodes for each optical channel in the WDM signal and operated in conjunction with the optical multiplexer/demultiplexers to provide an additional level of protection. That is, the actual routing of optical channels within any given node would be accomplished using switches that are responsive to control commands issued in accordance with the aforementioned verification process.

More specifically, an incoming WDM signal is supplied to demultiplexer 201 which separates the composite WDM signal into individual optical channels of different wavelengths. The supervisory optical channel is also demultiplexed or otherwise filtered or tapped from the WDM signal and is provided to supervisory element 202. A 1×2 optical switch 203 is coupled to demultiplexer 201 and receives one of the demultiplexed optical channels. For simplicity of illustration, only one 1×2 optical switch is shown although a node may have a plurality of such switches to correspond to each of the individual optical channels or a subset thereof. When optical switch 203 is operated in a first position or mode, the individual optical signal is dropped via "DROP" path 209 to optical translator unit 207 for subsequent transmission to a user or other network.

When the individual optical channel is not to be dropped at node 200, optical switch 203 would be operated in a second position or mode to route the optical channel through to 2×1 optical switch 204 via "THRU" path 215. Optical switch 204 is operated to either pass through the individual optical channel received from optical switch 203 or, alternatively, to pass through the individual optical channel being added via "ADD" path 208 from optical translator unit 206. The individual optical channels supplied as output from optical switch 204, as well as each of the other 2×1 switches (not shown), are then combined in multiplexer 205 to form a WDM signal. The WDM signal is then amplified by optical amplifier 210 and coupled with a supervisory optical channel supplied by supervisory element 202.

If ring node 200 was the node receiving a request to implement a "THRU" association and connection for an optical channel, optical switches 203 and 204 would be operated in accordance with the aforementioned verification process such that an individual optical channel would not be passed through the node, e.g., from optical switch 203 to optical switch 204 via "THRU" path 215 until an "ADD" association is confirmed at another node in the ring network.

It should be noted that the configuration of ring node 200 in FIG. 3 is meant to be illustrative and not limiting in any way. Furthermore, other alternatives to optical switches and other modifications to the various components used for wavelength add/drop, e.g., waveguide grating routers, thin film filter technology, gratings, and so on, are contemplated for use in ring node 200 in accordance with the teachings herein.

According to yet another illustrative embodiment, "DROP" associations can be used instead of "ADD" associations to verify a "break" in the ring. In general, various modifications will be apparent to one skilled in the art in order to practice the invention using "DROP" associations instead of "ADD" associations. In this manner and consistent with the preceding embodiments, a node will not be allowed to enter a "THRU" association for an optical channel until a "DROP" association is verified at one or more other nodes in the ring. Using the node configuration shown in FIG. 3 as an example, assume that the optical channel of interest (i.e., the optical channel for which another node has requested a "THRU" association) is dropped at node 200 via drop path 209. Similar to the preceding embodiments, the database at node 200 would first be checked to determine whether the "DROP" association is entered. Upon verifying the association is entered, the actual connections within node 200 would then be checked to confirm whether the optical channel is in fact being dropped. Again, various techniques can be employed for the latter step of verifying the actual connections, e.g., trace tones, detecting embedded bits in the stream of data transported within the optical channel, and so on.

Those skilled in the art will recognize that one practical configuration for ring node 200 could include an optical amplifier (not shown) at the receive side of node 200 in addition to optical amplifier 210 at the transmit side of node 200. For example, node 200 may also include an optical amplifier (not shown) at the input side of demultiplexer 201. One approach for verifying whether an optical channel is being dropped at node 200 in this configuration would be to apply the trace tone at a source node for this optical channel, e.g., at another node that is identified using a control scheme. If the tone is present at the optical amplifier (not shown) at the input side of demultiplexer 201, but not present at optical amplifier 210, then the actual "DROP" can be confirmed at node 200 for the optical channel. If the tone is present at both optical amplifiers, then the "DROP" cannot be confirmed since it would appear as though the optical channel is being routed through node 200. In yet another example, trace bits may be embedded in the data, e.g., SONET frames, being transported via the optical channel of interest. A "DROP" could then be confirmed by retrieving and reading the trace bits from the optical channel at both the input side (incoming from the ring network) and output side (outgoing to the ring network) of node 200, e.g., "DROP" confirmed if trace bits are detected at the input side but not the output side of node 200. Many other variations and techniques will be apparent to those skilled in the art and are contemplated by the teachings herein.

The verification process according to the principles of the invention can be implemented using a combination of hardware and software resources in a ring network. As such, the provisioning of such a ring network can be accomplished on a remote basis, e.g., via the control network. The switching arrangement used in the embodiment shown in FIG. 3 further supports the remote provisioning capability since the switches can be operated remotely, e.g., switching commands executed via control commands and so on. For example, the switches can be remotely controlled via the control system to add, drop, and pass through the individual optical channels in the WDM signal received by a ring node.

It should be noted that the functions of the various elements shown in the drawing can be provided through the use of dedicated hardware as well as hardware capable of executing software. When provided by a processor, the functions may be provided by a single dedicated processor, by a single shared processor, or by a plurality of individual processors, some of which may be shared. Moreover, a "processor" or "controller" should not be construed to refer exclusively to hardware capable of executing software, and may implicitly include, without limitation, digital signal processor (DSP) hardware, read-only memory (ROM) for storing software, random access memory (RAM), non-volatile storage and so on.

The foregoing embodiments are merely illustrative of the principles of the invention. Those skilled in the art will be able to devise numerous arrangements, which, although not explicitly shown or described herein, nevertheless embody those principles that are within the scope of the invention. For example, although the illustrative embodiments described herein are particularly well-suited for wavelength division multiplexed (DWDM) optical ring networks, those skilled in the art will understand from the teachings herein that the principles of the invention may also be employed in conjunction with other transmission network architectures in which lasing can occur. Moreover, the illustrative embodiments only show one direction of communication in a ring network, however, the principles of the invention can be used in networks with communications in both directions. Furthermore, "ADD" associations and connections were used in the illustrative embodiments to determine whether a "THRU" association could be allowed. However, other methods of verification can also be used, e.g., verifying "DROP" associations before allowing a "THRU" association and so on. Accordingly, the embodiments shown and described herein are only meant to be illustrative and not limiting in any manner. The scope of the invention is limited only by the claims appended hereto.

What is claimed is:

1. A method of preventing lasing of an optical channel of a particular wavelength in an optical ring network, the method comprising:

responsive to a request for establishing a pass through connection for an optical channel at a node in the optical ring network, automatically verifying the presence of a break in the optical ring network for the optical channel, wherein verifying the presence of a break comprises confirming that the optical channel has been added at another node in the ring network; and responsive to verifying the presence of the break, allowing the node in the network to establish the pass through connection for the optical channel, wherein the optical ring network includes a plurality of nodes capable of adding and dropping individual optical channels of different wavelengths from a wavelength division multiplexed signal.

2. The method according to claim 1, wherein confirming that the optical channel has been added comprises:

confirming the presence of an "ADD" association for the optical channel in a particular node in the ring network; and verifying actual signal connections corresponding to the "ADD" association at the particular node.

3. The method according to claim 2, wherein verifying actual signal connections comprises:

applying a trace tone to the optical channel; and verifying the presence of the trace tone in the optical channel along a prescribed transmission path within the particular node.

4. The method according to claim 3, further comprising the step of remotely provisioning the node in the network to establish the pass through connection for the optical channel via a control system.

5. The method according to claim 4, further comprising the step of, at a selected node, managing requests for pass through connections in the ring network.

6. The method according to claim 5, wherein managing requests comprises:

queuing requests received from other nodes in the ring network; and controlling the processing of the requests so that only one request is active at any given time in the ring network.

7. The method according to claim 2, wherein verifying actual signal connections comprises:

embedding trace bits in a data stream carried by the optical channel; and detecting the presence of the trace bits within the particular node at a point along a prescribed transmission path for the optical channel.

8. The method according to claim 2, wherein verifying actual signal connections comprises:

pulsing the optical channel according to a prescribed on/off alternating pattern; and detecting the presence of the alternating pattern within the particular node at a point along a prescribed transmission path for the optical channel.

9. A method of preventing lasing of an optical channel of a particular wavelength in an optical ring network, the method comprising:

responsive to a request for establishing a pass through connection for an optical channel at a node in the optical ring network, automatically verifying the presence of a break in the optical ring network for the optical channel, wherein verifying the presence of a break comprises confirming that the optical channel has been dropped at another node in the ring network; and responsive to verifying the presence of the break, allowing the node in the network to establish the pass through connection for the optical channel, wherein the optical ring network includes a plurality of nodes capable of adding and dropping individual optical channels of different wavelengths from a wavelength division multiplexed signal.

10. The method according to claim 9, wherein confirming that the optical channel has been dropped comprises:

confirming the presence of a "DROP" association for the optical channel in a particular node in the ring network; and verifying actual signal connections corresponding to the "DROP" association at the particular node.

11. The method according to claim 10, wherein verifying actual signal connections comprises:

at a source node, applying a trace tone to the optical channel;

verifying the presence of the trace tone in the optical channel at an input side of the particular node; and verifying the absence of the trace tone in the optical channel at an output side of the particular node.

12. The method according to claim 10, wherein verifying actual signal connections comprises:

embedding trace bits in a data stream carried by the optical channel;

detecting the presence of the trace bits in the optical channel at an input side of the particular node; and verifying the absence of the trace bits in the optical channel at an output side of the particular node.

13. The method according to claim 10, wherein verifying actual signal connections comprises:

pulsing the optical channel according to a prescribed on/off alternating pattern; and detecting the presence of the alternating pattern in the optical channel at an input side of the particular node; and verifying the absence of the alternating pattern in the optical channel at an output side of the particular node.

14. A method of preventing lasing of an optical channel of a particular wavelength in an optical ring network, the method comprising:

receiving a request to establish pass through routing of an optical channel at a particular node in the optical ring network;

responsive to the request, automatically verifying whether the optical channel has been added or dropped at one or more other nodes in the optical ring network; and allowing the particular node in the optical ring network to establish the pass through routing for the optical channel only after verifying that the optical channel has been added or dropped at one or more of the other nodes, wherein the optical ring network includes a plurality of nodes capable of adding and dropping individual optical channels of different wavelengths from a wavelength division multiplexed signal.

* * * * *